Dec. 21, 1948.   G. E. HENNING   2,456,704
APPARATUS FOR TESTING AND MARKING
INSULATED CONDUCTORS

Filed May 30, 1945   3 Sheets-Sheet 1

INVENTOR
G. E. HENNING
BY
ATTORNEY

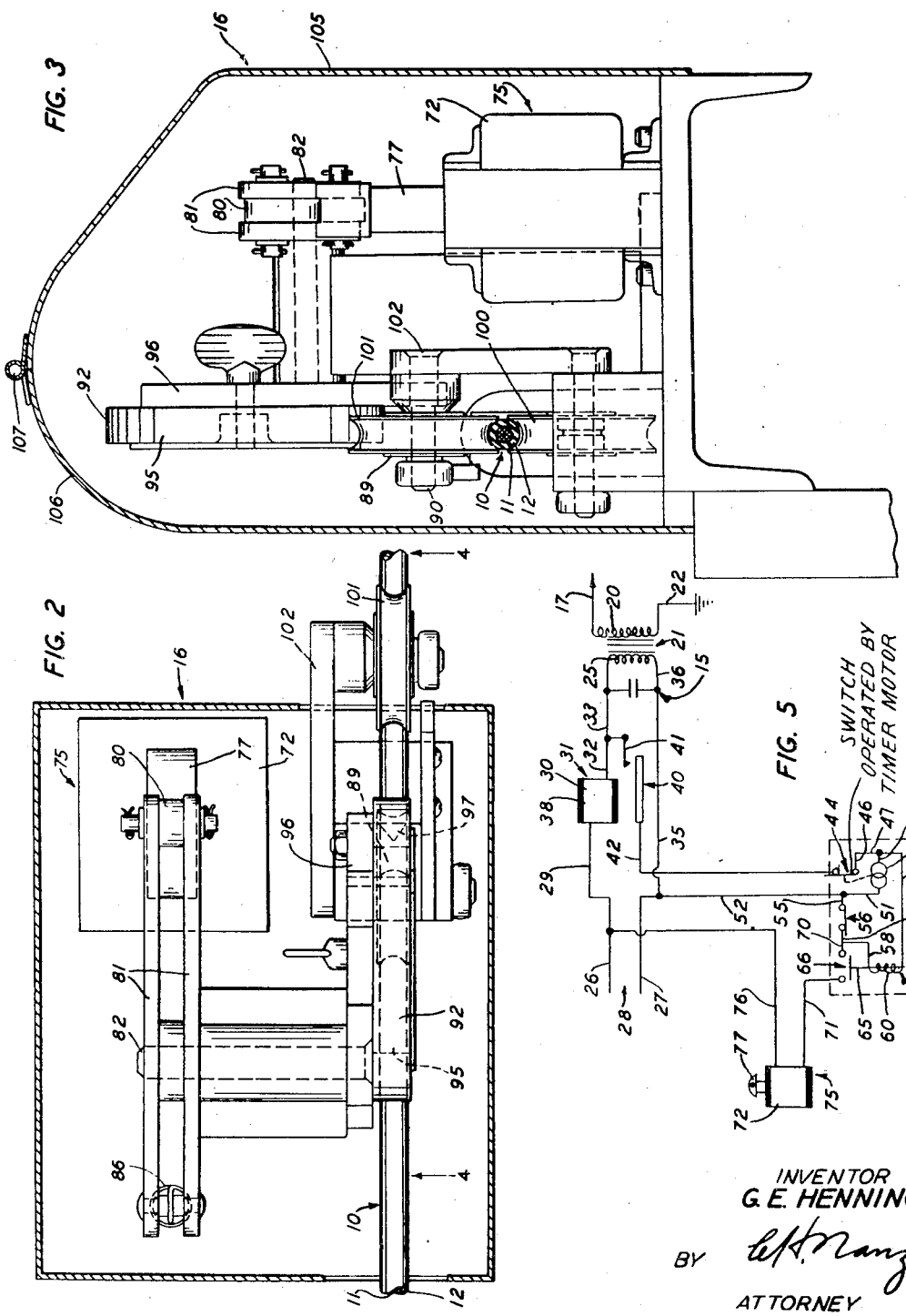

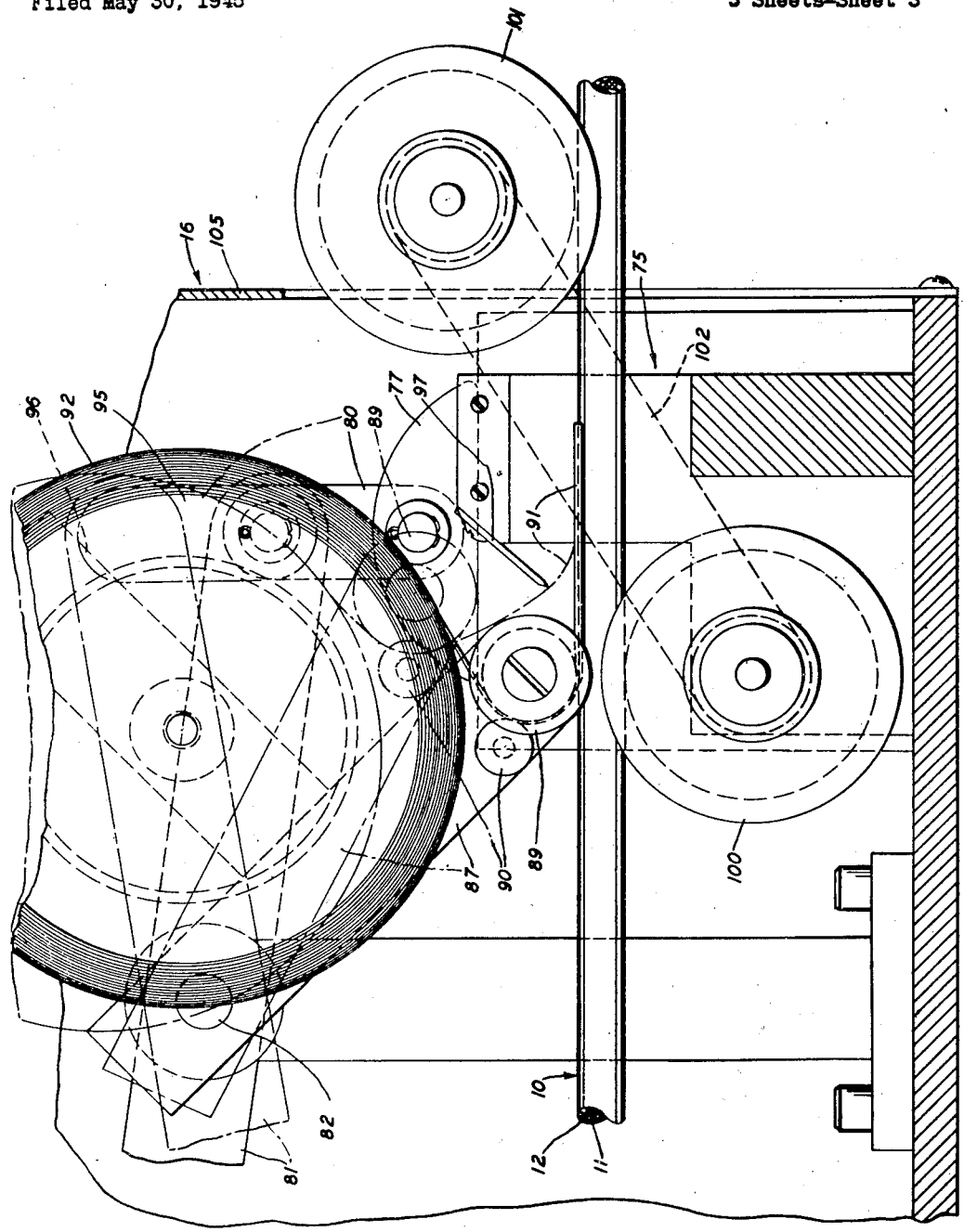

Patented Dec. 21, 1948

2,456,704

UNITED STATES PATENT OFFICE 2,456,704

APPARATUS FOR TESTING AND MARKING INSULATED CONDUCTORS

George E. Henning, Baltimore, Md., assignor to Western Electric Company, Incorporated, New York, N. Y., a corporation of New York Application May 30, 1945, Serial No. 596,797

6 Claims. (Cl. 175—183)

This invention relates to apparatus for testing and marking insulated conductors and has for its object the provision of new and improved apparatus for testing and marking insulating conductors.

An apparatus for testing and marking insulated conductors forming one embodiment of the invention includes means for applying adhesive tape to an insulated conductor and means for actuating the tape-applying means when a test set associated therewith locates a defect therein.

A complete understanding of the invention may be obtained from the following detailed description of an apparatus for testing and marking insulating conductors constituting a specific embodiment thereof, when read in conjunction with the appended drawings, in which:

Fig. 2 is a fragmentary, horizontal section of the apparatus;

Fig. 3 is a fragmentary, vertical section of the apparatus;

Fig. 4 is an enlarged, fragmentary, vertical section taken along line 4—4 of Fig. 2, and Fig. 5 is a diagrammatic view of an electrical circuit included in the apparatus.

Figure 1:
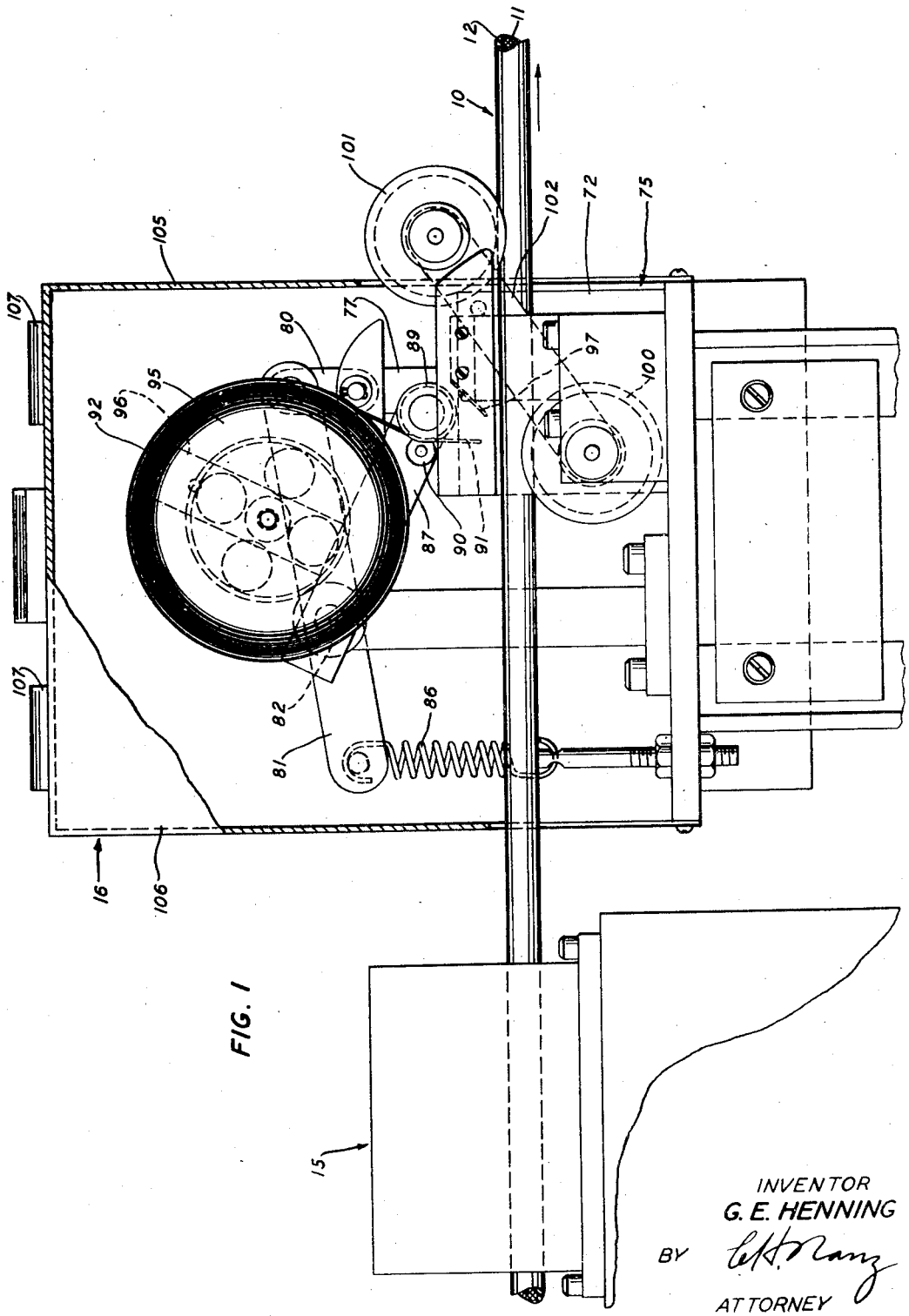
Fig. 1 is a front elevation of an apparatus embodying the invention with portions thereof broken away.

Referring now in detail to the drawings, an insulated conductor 10 (Fig. 3) including a core 11 and a jacket 12 is advanced toward the right, as viewed in Fig. 1, at a predetermined rate of speed by suitable cable-advancing means (not shown). The insulated conductor is advanced from the test set through a tape-applicator 16. The test set 15 includes an electrode 17 (Fig. 5) for contacting the periphery of the jacket 12 of the insulated conductor (Fig. 2), and the core 11 of the insulated conductor is grounded by suitable grounding means (not shown).

The electrode 17 (Fig. 5) is connected to an end of a secondary winding 20 of a transformer 21 and the other end of the secondary winding is grounded by a grounding conductor 22. A primary winding 25 of the transformer is connected to conductors 26 and 27 of a power line 28 through a conductor 29, a winding 30 of a high-sensitivity relay 31 and conductors 32 and 33, and conductors 35 and 36, respectively.

When the electrode 17 contacts a defect in the jacket 12 of the insulated conductor 10, a surge of current flows through the winding 30 of the high-sensitivity relay 31, whereby an armature 38 of the relay 31 closes a normally open switch 40 thereof. When the switch 40 is closed, current flows from the conductor 26 to the conductor 27 through the following circuit: the conductor 29, the winding 30, conductors 32 and 41, the switch 40, a conductor 42, a normally closed switch 44 of a timer 45, conductors 46, 47 and 48, a timer motor 50 and conductors 51 and 52. This energizes the timer motor, which begins to run and current flows through the above-described circuit and maintains the winding 30 of the high-sensitivity relay 31 in an energized condition, whereby the switch 40 of the high-sensitivity relay is maintained in a closed position. Thus, when the defect in the jacket 12 of the insulated conductor 10 (Fig. 3) is advanced out of contact with the electrode 17 (Fig. 5), which usually occurs almost immediately after contact therewith, the switch 40 remains closed.

At the instant that the timer motor 50 is energized, electrical current flows through the following circuit: a conductor 55, a normally closed, manually operable switch 56, conductors 57 and 58, a winding 60 of a relay 61 and a conductor 62, which is connected to the conductor 47. That is, the winding 60 of the relay 61 is in parallel with the timer motor, and when the timer motor is energized by the closing of the switch 40, the winding 60 is energized simultaneously therewith, the energization of the winding 60 and actuates an armature 65 to close a normally open switch 66. When the switch 66 is closed, current flows through the following circuit: the conductor 27 of the power line 28, conductors 52 and 55, the switch 56, conductors 57 and 70, the switch 66, conductor 71, a winding 72 of a solenoid 75 and conductors 76 and 26, whereby the winding 72 of the solenoid 75 draws an actuating armature 77 thereof downwardly, as viewed in Fig. 5.

A link 80 (Fig. 1) connects levers 81—81 (Fig. 2) mounted on a shaft 82 to the actuating armature 77, and when the armature 77 is drawn downwardly, as viewed in Fig. 1, the levers and the shaft are turned in a clockwise direction, as viewed in Fig. 1, against the action of a tension spring 86. This swings an arm 87 fastened to the shaft in a clockwise direction, as viewed in Fig. 2, so as to move the outer end of the arm toward the insulated conductor 10. A pressing roller 89 having a groove whose section is curved slightly more than the periphery of the conductor 10 is mounted rotatably on the outer end of the arm, and a guide pin 90 is positioned on the arm at a point adjacent to the roller 89. When the arm 87 is swung in a clockwise direction, as viewed in Fig. 1, it forces the roller 89 downwardly toward the insulated conductor 10 and the roller 89 forces the end of an adhesive tape 91 against the insulated conductor, whereby the adhesive tape 91 is stuck to the insulated conductor. The roller 89 serves to press the tape 91 tightly against the insulated conductor as long as the winding 72 of the solenoid 75 remains energized.

The insulated conductor 10, which is advanced to the right, as viewed in Fig. 1, draws the tape stuck thereto from a pad of tape 92, which is mounted on a rotatable reel 95 supported by a standard 96 secured to the arm 87. The adhesive tape 91 is applied to the insulated conductor in this manner for a predetermined period of time after the timer 50 is initially energized, which is determined by the timer motor 50, which opens the switch 44 at the end thereof. When the switch 44 is opened, the timer motor 50 is deenergized and resets to zero, the winding 30 of the high-sensitivity relay 31 is deenergized and the switch 40 opens, the winding 60 of the relay 61 is deenergized and the switch 66 opens, and the winding 72 of the solenoid 75 is deenergized.

When the winding 72 of the solenoid 75 is deenergized, the tension spring 86 pivots the levers 81—81 in a counterclockwise direction, as viewed in Fig. 1, and the shaft 82 and the arm 87 are turned in a counterclockwise direction, whereby the roller 89 is swung away from the insulated conductor 10. As the roller 89 is so swung, it moves past a pointed knife 97 (Fig. 4) stationed adjacent to the path thereof. The insulated conductor continues to advance to the right, as viewed in Fig. 1, and moves the tape 91 into contact with the knife, which severs the tape, whereby a portion of the adhesive tape of a predetermined length is applied to the insulated conductor. A grooved roller 100 serves to support the insulated conductor when the roller 89 presses the tape 91 thereagainst, and a grooved roller 101 mounted on a pivotally mounted arm 102, presses the portion of the adhesive tape 91 applied to the insulated conductor tightly thereagainst.

The tape-applicator 16 (Fig. 3) includes a housing 105 having a door 106 pivotally mounted on the remainder thereof by hinges 107—107 (Fig. 1). The housing 105 serves to enclose the movable elements of the tape-applicator, and the door 106 supplies access thereto for replenishing the pad of tape 92 or for threading the insulated conductor 10 through the tape-applicator.

In the operation of the apparatus for testing and marking insulated conductors described hereinabove, the insulated conductor 10 is advanced by the advancing means (not shown) toward the right, as viewed in Fig. 1, and is drawn through the test set 15 and the tape-applicator 16. When the test set 15 locates a defect in the jacket 12 of the cable, the winding 72 of the solenoid 75 is energized and the arm 87 is swung in a clockwise direction, as viewed in Fig. 1, whereby the roller 89 moves the end of the adhesive tape 91 into contact with the insulated conductor and presses it tightly thereagainst, while the insulated conductor is supported at a point directly below the roller 89 by the supporting roller 100. The arm 87 and the roller 89 are held in these positions while the tape 91 is drawn from the pad of tape 92 by the movement of the insulated conductor relative to the tape-applicator 16, which movement of the tape 91 rotates the roller 89. A predetermined period of time after the test set 15 has located a defect in the jacket 12 of the insulated conductor, the timer motor 50 opens the switch 44 and the winding 72 of the solenoid 75 is deenergized. The timer 45 then resets to zero, the switch 44 is reclosed, and the tension spring 86 pivots the arm 87 in a counterclockwise direction, as viewed in Fig. 1. The tape 91 is drawn, by this pivoting movement and the movement of the insulated conductor, into contact with the pointed knife 97, which severs the tape. The operation described hereinabove is repeated when another defect in the jacket 12 is advanced through the test set 15.

The apparatus described hereinabove serves to press the adhesive tape 91 against insulated conductors such as the insulated conductor 10 and applies equal lengths of the tape 91 to defects located by the test set 15. The adhesive tape is applied to the insulated conductor 10 without stopping the movement or testing thereof so that the entire length of the insulated conductor may be tested in one continuous operation, while the defects thereof are marked so that they may be relocated and repaired after the entire length of the insulated conductor is tested.

What is claimed is:

1. In an apparatus for testing and marking insulated conductors including a test set for locating defects in an insulated conductor being advanced therepast, a tape-applicator, which comprises means for holding a pad of adhesive tape, means for pressing against the insulated conductor an end of the adhesive tape, means for actuating the tape-pressing means, means for moving the tape-pressing means away from the insulated conductor a predetermined period of time after the tape-pressing means is actuated, and means for severing the tape when the tape-pressing means is moved away from the insulated conductor.

2. In an apparatus for testing and marking insulated conductors including a test set for locating defects in an insulated conductor being advanced therepast at a predetermined rate of speed, a tape-applicator positioned adjacent to the test set for applying an adhesive tape to the insulating conductor when the test set locates a defect therein, which comprises means for holding a supply of the adhesive tape, means movable toward the insulated conductor for pressing an end of the adhesive tape against the insulated conductor, means for moving the tape-pressing means toward the insulated conductor, means for moving the tape-pressing means away from the insulated conductor a predetermined period of time after it has been moved toward the insulating conductor, and means for severing the tape when the tape-pressing means is moved away from the insulated conductor, whereby a portion of the tape having a predetermined length is applied to the insulated conductor.

3. In an apparatus for testing and marking insulated conductors including a test set for locating defects in an insulated conductor, a tape-applicator being advanced therepast at a predetermined rate of speed, which comprises means for holding a supply of adhesive tape, a shaft, an arm rigidly fastened to the shaft, means positioned on the end of the arm for holding an end portion of the adhesive tape, means for urging the arm away from the insulated conductor, a solenoid for pivoting the arm against the action of the arm-urging means to move the tape-holding means toward the insulated conductor, whereby the tape-holding means presses the tape against the insulated conductor, means for energizing the solenoid, means for maintaining the solenoid in an energized condition for a predetermined period of time after the initial energization thereof, means for deenergizing the solenoid after the expiration of said predetermined period of time, whereby the arm-urging means swings the tape-holding means away from the insulated conductor, a knife positioned adjacent to the path of the holding means for severing the portion of the tape applied to the insulated conductor from the remainder thereof, and means for pressing the tape against the insulated conductor after it has been applied thereto.

4. In an apparatus for testing and marking insulated conductors including a test set for locating defects in an insulated conductor having advanced therepast at a predetermined rate of speed, a tape-applicator positioned adjacent to the test set, which comprises means for holding a supply of adhesive tape, means for moving an end of the adhesive tape into contact with the insulated conductor, a solenoid for actuating the tape-moving means, means for energizing the solenoid, timing means forming a holding circuit with the energizing means for holding the energizing means in operative condition for a predetermined period of time, whereby said solenoid is energized for a predetermined period of time, a switch in said holding circuit opened by the timing means at the end of said predetermined period of time for deenergizing the holding circuit, whereby the solenoid is deenergized, means for moving the tape-moving means away from the insulated conductor when the solenoid is deenergized, and a knife positioned adjacent to the path of movement of the tape-moving means for severing the portion of the tape applied to the insulated conductor from the remainer thereof.

5. In a tape-applicator, an arm mounted for pivotal movement about one end thereof, means for holding a supply of tape, tape-guiding means mounted on the other end of the arm, means for pivoting the arm in a direction in which the tape-guiding means presses the tape against an insulated conductor being advanced in a predetermined direction therepast, means for actuating the arm-pivoting means, means for pivoting the arm in a direction in which the tape-guiding means is moved away from the insulated conductor, and a pointed knife positioned so as to have the tape moved into contact therewith by the advancing conductor after the tape-guiding means is moved away from the conductor.

6. In an apparatus for testing and marking insulated conductors including a test set for locating defects in a conductor being advanced therepast at a predetermined rate of speed, a tape-applicator, which comprises a reel for holding a pad of adhesive tape, a shaft, an arm having one end thereof rigidly fastened to the shaft for supporting the reel, a pressing roller mounted on the other end of the arm, a guide roller mounted on the arm adjacent to the pressing roller for holding an end of the adhesive tape therebetween, means for urging the arm away from the insulated conductor, a solenoid for rotating the shaft to swing the arm and the pressing roller toward the insulated conductor, whereby the pressing roller presses said end of the adhesive tape against the insulated conductor, means for energizing the solenoid, timing means for maintaining the solenoid in an energized condition for a predetermined period of time after the initial energization of the solenoid and for deenergizing the solenoid after the expiration of said predetermined time, whereby the urging means pivots the arm so as to swing the pressing roller away from the insulated conductor, a pointed knife positioned adjacent to the path of the pressing roller as it is swung away from the insulated conductor for severing the portion of the adhesive tape applied to the insulating conductor from the remainder thereof, a grooved roller for supporting the insulated conductor against the pressure of the pressing roller, and a grooved roller for pressing the portion of the adhesive tape applied to the insulated conductor tightly thereagainst.

GEORGE E. HENNING.

REFERENCES CITED

The following references are of record in the file of this patent:

UNITED STATES PATENTS

| Number | Name | Date |
|---|---|---|
| 1,919,802 | Pfeiffer | July 25, 1933 |
| 2,087,783 | Savage | July 20, 1937 |

Certificate of Correction

Patent No. 2,456,704.  December 21, 1948.

GEORGE E. HENNING

It is hereby certified that errors appear in the printed specification of the above numbered patent requiring correction as follows:

Column 5, line 16, claim 4, for the word "having" read *being*; lines 38 and 39, same claim, for "remainer" read *remainder*;

and that the said Letters Patent should be read with these corrections therein that the same may conform to the record of the case in the Patent Office.

Signed and sealed this 20th day of September, A. D. 1949.

[SEAL]

JOE E. DANIELS,
*Assistant Commissioner of Patents.*